No. 613,194. Patented Oct. 25, 1898.
W. M. DEICHLER.
WATER FILTER.
(Application filed Sept. 18, 1897.)
(No Model.)
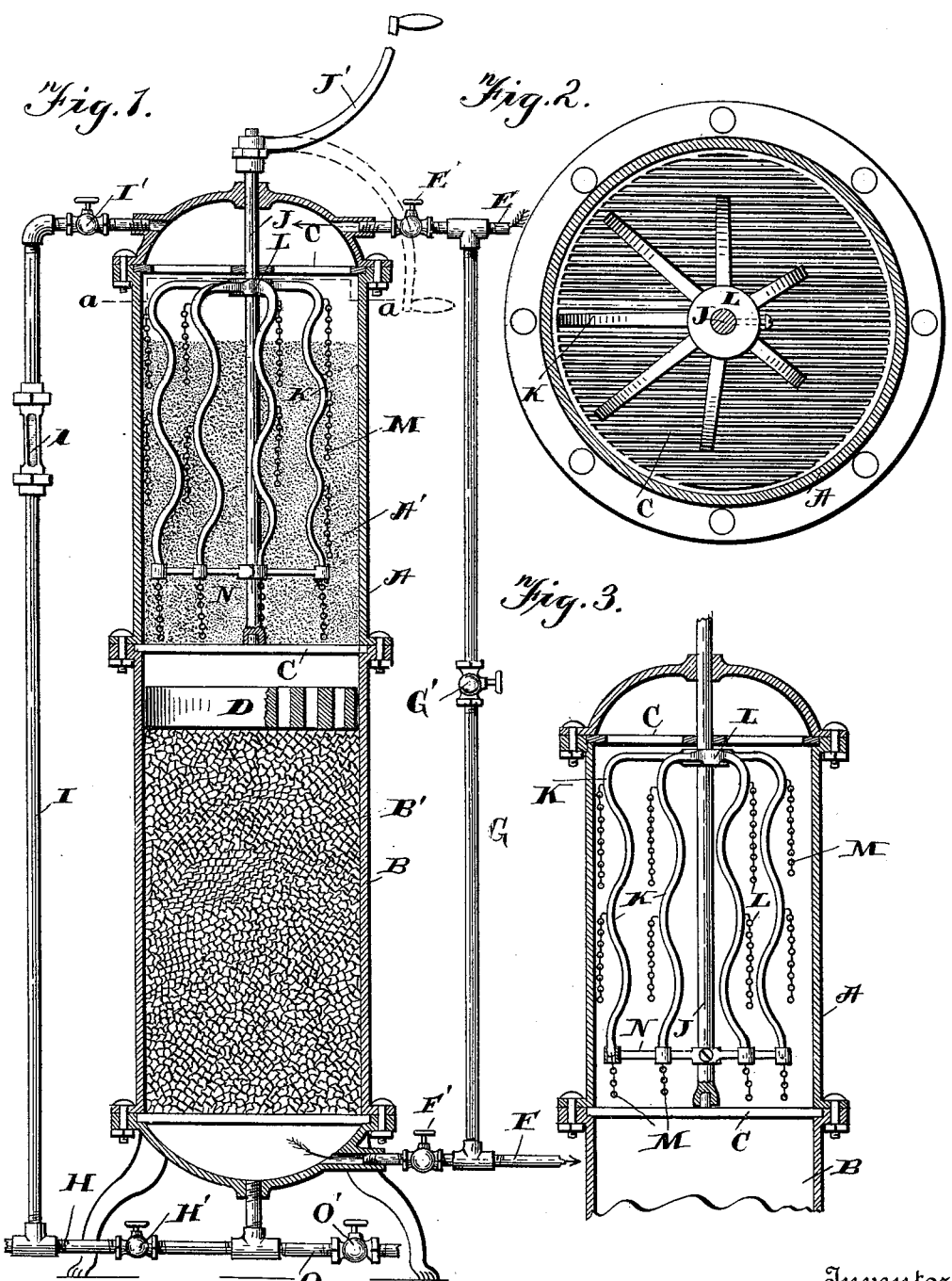

United States Patent Office.

WILLIAM M. DEICHLER, OF LANCASTER, PENNSYLVANIA.

WATER-FILTER.

SPECIFICATION forming part of Letters Patent No. 613,194, dated October 25, 1898.

Application filed September 18, 1897. Serial No. 652,191. (No model.)

*To all whom it may concern:*

Be it known that I, WILLIAM M. DEICHLER, of Lancaster, in the county of Lancaster and State of Pennsylvania, have invented certain new and useful Improvements in Water-Filters; and I do hereby declare the following to be a full, clear, and exact description of the invention, such as will enable others skilled in the art to which it pertains to make and use it, reference being had to the accompanying drawings, which form part of this specification.

This invention relates to water-filters, and has particular reference to a new and improved arrangement of granular beds, to the arrangement of water-circulating pipes, and to apparatus for agitating the sand bed while being cleansed.

One object of the present invention is to so arrange the sand and charcoal beds that they will be separate and distinct, the unfiltered water first passing through the sand, where it is relieved of all impurities held in suspension, and after being thus cleansed percolates through the charcoal bed, where solution impurities are eradicated. The charcoal being free from the sand bed and receiving water only after it has passed through the latter is maintained free of slime and suspension impurities and in active condition for effectually removing the impurities against which it is directed.

Agitating apparatus now generally used is secured centrally to a shaft arranged centrally in the filter-cylinder, with the agitating devices depending at equal distances from the shaft, so that when the latter is rotated said devices follow each other in one track or course, with the effect that while the portion of the bed contiguous to such course is stirred the remainder remains undisturbed. With such insufficient agitation the benefits derived from a reverse current of water through the filter, as when cleansing, are materially lessened, as a thorough stirring of the sand is necessary in order to perfectly cleanse the bed. Devices previously known and used are also deficient in not thoroughly cutting or scraping accumulated deposits on the inner wall of the filter during the cleansing operation, for if such deposit is permitted to remain and accumulate the efficiency of the bed is greatly impaired and the metal of the filter corrodes. It therefore becomes a further object of the invention to arrange the agitating apparatus eccentrically to the actuating-shaft, so as to effectually stir all parts of the granular bed from center to circumference, and to provide devices for effectually cutting away any deposit which may accumulate on the casing-wall.

The invention consists in the novel features of construction hereinafter fully described and claimed, and illustrated by the accompanying drawings, in which—

Figure 1 is a vertical sectional view of the filter provided with my improved apparatus. Fig. 2 is a sectional plan view on line *a a* of Fig. 1. Fig. 3 is a sectional view of the upper portion of the filter.

The filter-casing consists of upper portion A and lower portion B, separated therefrom by grates C. The granular bed A' in casing portion A is of sand, and bed B' in portion B is of charcoal, the latter being closely packed and so held by perforated weight D. Water passes to the upper end of the filter-casing from the main through pipe E and from the bottom of the casing to the house through pipe F. Pipes E and F are connected by pipe G, having valve G', and pipe E is provided with valve E' between pipe G and the filter, and pipe F is provided with a similar valve F'. The waste or sewer pipe H leads from the casing-bottom, the same being valved at H', and this outlet or sewer pipe is connected by pipe I, valved at I', to the upper end of the filter-casing. In pipe I is arranged the observation-tube *i*.

Upright shaft J is journaled centrally in casing portion A and at its upper end protrudes therefrom and is adapted to be rotated by crank J' or any other suitable device. Secured to and adapted to be rotated by this shaft is the agitator apparatus for sand bed A', said apparatus consisting of a plurality of arms K, radiating from collar or hub L, keyed to shaft J. The upper horizontal ends of arms K are of different lengths, the longest reaching almost to the casing-wall, at which point it is bent downward and formed with reverse curves, as shown, thus presenting a waving outline. The other arms are of like construction, excepting that their upper ends vary in length, as before stated, so that when the agitator is rotated within the bed all portions of the latter will be effectually stirred. This arrangement of arms necessitates the following of each in a separate or distinct circular course about the axial shaft instead of training in a single circular course, as when the series of agitators are arranged concentrically with the actuating-shaft. Short chain sections M depend from the outward curves or bulges of the agitator-arms, and as the latter are rotated said chains have a cutting action in passing through the sand, which effectually loosens the same, and are also most effectual in cutting away any deposit that may accumulate upon the inner wall of the filter-casing. The lower ends of arms K are secured by spider N, keyed to shaft J, as shown. Pipe O from a stand-boiler or other hot-water source connects with the casing-bottom and is provided with valve O'.

In use valves E' and F' are opened, and valves G', I', H', and O' are closed, with the effect that water is passed into the upper end of the casing and percolates through the sand bed A', down through charcoal bed B', and out through service-pipe F.

Now when it is desired to clean the filter, valves E' and H' are closed and valves G', F', and I' opened, with the effect that the water from the supply will pass downward through pipe G and into the lower end of the filter-casing, from whence it will flow upward in reverse direction through the charcoal bed from the lower to the upper end of the sand bed and out through pipe I to sewer-pipe H. During this cleaning operation the agitator is kept constantly in motion, with the effect that bed A is agitated, stirred, and loosened in a most effectual manner, and water is permitted to flow in this reverse direction until the same becomes quite clear, as may be seen through glass i. At this juncture valve F' is closed and valve O' opened to admit hot water or steam, which passes in like course upward through the filter and thoroughly scalds the bed and destroys any microbes or germs therein. Valve O' is then closed, as is also valve I', and the filter is cooled by admitting water through valve E' and permitting the same to empty at the bottom of the filter through valve H', and this cooling-current will serve the additional purpose of carrying away any sediment that may have become lodged in the casing-bottom. When sufficiently cooled, the valves are all closed, with the exception of E' and F', when the apparatus will be again in proper adjustment for filtering.

By having the sand bed above and separated from the charcoal bed with the water first passing through the sand bed, all impurities held in suspension are removed therefrom and the water passes in a clear state to the charcoal bed free from all impurities excepting those held in solution, such as acids, and, as is well known, the charcoal effectually eliminates them from the water. By means of the arrangement here shown and described the charcoal is kept clear of slime and in an effectually-packed condition, whereas were the same not separated from the sand bed it would become impregnated with the impurities held in suspension, and its effectiveness thereby materially lessened.

Having thus fully described my invention, what I claim, and desire to secure by Letters Patent, is—

1. An improved filter including a casing, an intermediate grating within and fixed to the casing, a sand bed supported by the grating, a charcoal bed below and free of the grating, a perforated weight vertically movable in the casing and arranged beneath the grating and resting upon the charcoal bed and maintaining the same constantly in packed state, substantially as shown and described.

2. An improved filter comprising a casing, granular beds therein, valved supply-pipe E leading to the upper end of the casing, valved service-pipe F leading from the lower end of the casing, valved hot-water pipe O communicating with the bottom of the casing, and valved outlet-pipe I leading from the top of the casing, substantially as shown and described.

3. An improved agitating apparatus for granular-bed filters, comprising an axial shaft, and a circular series of depending agitators eccentrically secured to the shaft, substantially as shown and described.

4. An improved agitating apparatus for granular-bed filters, comprising an axial shaft, and agitating devices of waving outline rotatable with the shaft, substantially as shown and described.

5. An improved agitating apparatus for granular-bed filters, comprising elongated agitating devices of waving outlines and means for moving said devices through the granular bed, substantially as shown and described.

6. An improved agitating apparatus for granular-bed filters, comprising a circular filter-casing, circular series of depending agitating-devices arranged eccentrically in said casing, and operating means arranged centrally within the casing for rotating said agitating devices, substantially as shown and described.

7. An improved agitating apparatus for granular-bed filters comprising elongated prongs of waving outline, chains secured to the prongs, and actuating means, substantially as shown and described.

8. An improved filter-bed agitator, including an axial shaft, a hub thereon, agitator-arms extending outward and downward from the hub, and a spider on the axle for securing the lower ends of the arms, substantially as shown and described.

In testimony whereof I affix my signature in presence of two witnesses.

WILLIAM M. DEICHLER.

Witnesses:
D. M. ROTHENBOYER,
SAML. W. DILLER.